(12) United States Patent
Rolff

(10) Patent No.: US 7,168,287 B2
(45) Date of Patent: Jan. 30, 2007

(54) REFERENCE LEAKAGE DEVICE FOR LEAK SNIFFER DETECTOR

(75) Inventor: Randolf Rolff, Kerpen-Horrem (DE)

(73) Assignee: Inficon GmbH (DE)

( * ) Notice: Subject to any disclaimer, the term of this patent is extended or adjusted under 35 U.S.C. 154(b) by 0 days.

(21) Appl. No.: 10/527,905

(22) PCT Filed: Aug. 14, 2003

(86) PCT No.: PCT/EP03/09013

§ 371 (c)(1),
(2), (4) Date: Sep. 7, 2005

(87) PCT Pub. No.: WO2004/034008

PCT Pub. Date: Apr. 22, 2004

(65) Prior Publication Data

US 2006/0150707 A1    Jul. 13, 2006

(30) Foreign Application Priority Data

Sep. 26, 2002  (DE) ............................... 102 45 044
Feb. 28, 2003  (DE) ............................... 103 08 687

(51) Int. Cl.
*G01N 1/24* (2006.01)

(52) U.S. Cl. ............................. 73/1.05; 73/1.03; 73/40

(58) Field of Classification Search ................ 73/1.05, 73/1.03, 1.01, 1.02, 1.04, 1.06, 40, 40.7
See application file for complete search history.

(56) References Cited

U.S. PATENT DOCUMENTS

| 2,981,091 | A | | 4/1961 | Roberts |
| 3,310,974 | A | * | 3/1967 | Banks ........................ 73/1.02 |
| 5,353,637 | A | * | 10/1994 | Plumb et al. ............ 73/152.17 |
| 6,189,369 | B1 | | 2/2001 | Yokogi |
| 6,918,281 | B2 | * | 7/2005 | Sussman et al. ............. 73/1.06 |
| 2001/0047692 | A1 | * | 12/2001 | Lipscomb et al. ....... 73/864.25 |

FOREIGN PATENT DOCUMENTS

| DE | 32 43 752 A1 | 5/1984 |
| DE | 198 46 798 A1 | 4/2000 |
| DE | 199 63 073 A1 | 6/2001 |
| DE | 101 18 085 A1 | 10/2002 |
| DE | 101 22 733 A1 | 11/2002 |
| FR | 1.343.219 | 11/1963 |
| FR | 2 749 079 | 11/1997 |

* cited by examiner

*Primary Examiner*—Michael Cygan
(74) *Attorney, Agent, or Firm*—Peter J. Bilinski

(57) ABSTRACT

A reference leakage device for a leak sniffer detector that is equipped with a sniffing tip and a control unit. The reference leakage device includes a gas reservoir and a constriction wherefrom there is released a specific amount of test gas, at least during calibration. A sensor is located in the constriction for detecting the approach of the sniffing tip wherein the device further is capable of transmitting signals to control unit of the leak detector.

15 Claims, 3 Drawing Sheets

REFERENCE LEAKAGE DEVICE FOR LEAK SNIFFER DETECTOR

FIELD OF THE INVENTION

The invention concerns a reference leakage device for a leak sniffer apparatus.

BACKGROUND OF THE INVENTION

Many systems and products in industry and research are subject to high requirements regarding their leaktightness. These requirements depend on the type of leak, the leak rate or size of the leak which leak detection method is applied, respectively, which leak detection instrument is employed.

In the instance of test samples or subassemblies manufactured in the refrigerating industry, automotive industry or other industries, the method of sniffer leak detection is frequently employed. This method requires that the test sample or subassembly contains a test gas, preferably at an overpressure. Frequently, helium is employed as the test gas which before sealing off is introduced into the hollow spaces which are to be analysed for the presence of leaks. It is also known to employ gases present in any case within the test samples or subassemblies as the test gas, for example, SF6 or halogen gases in the refrigerating industry.

The test sample which is to be analyzed for the presence of leaks is scanned with the aid of the suction intake (tip) of a sniffer gun, which takes in test gas flowing out of a possibly present leak and which supplies said lest gas to a test gas detector. The test gas detector may be accommodated together with other components in an instrument to which the sniffer gun is connected, among other things, by means of a hose. Provided the detector is sufficiently small (for example, an infrared gas analyser), it may also be accommodated in the sniffer gun itself, thereby significantly reducing the response time.

Test gas leak detection instruments need to be calibrated frequently. To this end, it is known to employ reference leakage devices exhibiting a defined leak. Reference leakage devices for these purposes comprise a gas reservoir and a constriction having a known conductance. For the purpose of calibrating a leak detection instrument equipped with a sniffer gun, commonly the sniffer tip is located in the vicinity of the constriction and the leak rate indication is aligned. From the German patent application publications 27 02 002, 32 43 752 and 199 63 073, reference leakage devices of this kind are known.

Reference leakage devices shall exhibit, on the one hand, a constant gas flow over a period of time which is as long as possible (significantly longer than one year). On the other hand, if they are to be accommodated within the enclosure of a leak detection instrument, they need to be sufficiently small in size. This requires that the test gas be present under a high-pressure (8 bar and more) within the reference leakage device. Reference leakage devices of this kind are temperature sensitive. This applies in particular when the test gas assumes the liquid state at the pressures stated. For safety reasons, a maximum temperature must not be exceeded. Installing, for reasons of operational convenience, a reference leakage device of this kind within a leak detection instrument containing heat producing components is problematic, frequently even impossible.

During the calibration process employing an external reference leakage device it is required in the instance of the leak detectors employed to date, to start the calibration through a menu entry and confirm the process of "Sniff leak"/"Sniff air". This is rather cumbersome and contradicts the idea of an instrument which is easy to operate. This applies above all to—frequently unskilled—persons who need to analyse items moving on a conveyor as to the presence of leaks using a sniffer gun. They cannot bother themselves as to an operation-wise cumbersome and therefore time-consuming calibration process.

SUMMARY OF THE INVENTION

It is the task of the present invention to design an external reference leakage device, i.e. a reference leakage device separated from a leak detection instrument, such that said reference leakage device allows simplified operation of the leak detection instrument while performing the calibration.c This task is solved by the present invention through the characterising features of the patent claims. Through these measures it is achieved, by only locating the sniffer tip in the vicinity of the constriction of the reference leakage device, that the calibration of the leak detection instrument separately from the reference leakage device can be performed.

This task is solved by the present invention. Through these measures it is achieved, by only locating the sniffer tip in the vicinity of the constriction of the reference leakage device, that the calibration of the leak detection instrument separately from the reference leakage device can be preformed

BRIEF DESCRIPTION OF THE DRAWINGS

Further advantages and details of the present invention shall be explained with reference to the examples of embodiments depicted schematically in the drawing figures in which.

DETAILED DESCRIPTION

Figure 1:
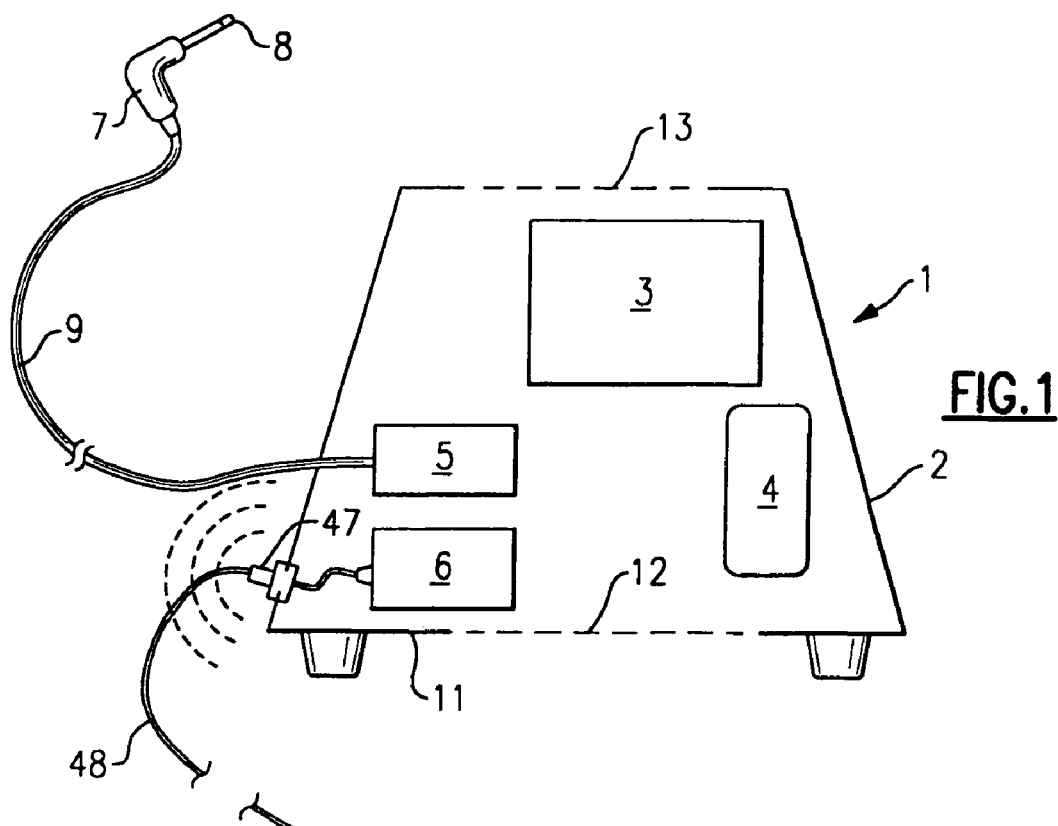
FIG. 1 depicts a sniffer leak detection instrument with components built in therein.

The leak detection instrument 1 depicted in FIG. 1 is equipped with a housing 2, in which there are located instrument components. Presented by way of blocks are, for example, a vacuum pump 3, a power supply unit 4, a gas detector 5, and a control unit 6. Located exterior with respect to the housing is the sniffer gun 7 with its intake point (tip) 8. Said sniffer gun is connected through a hose 9 to the gas detector 5. In the instance of the gas detector 5 being accommodated within the sniffer gun 7, said sniffer gun is connected through signal lines to the control unit. All instrument components are accommodated within housing 2. The housing 2 itself is equipped in the area of the bottom section 11 and in the upper section with cooling air entry openings 12, respectively louvres 13. Since at least some of the instrument components generate heat, a cooling air flow due to the thermal conditions is effected. Should this flow be inadequate, an additional fan may be provided supporting the cooling air flow.

Figure 2:
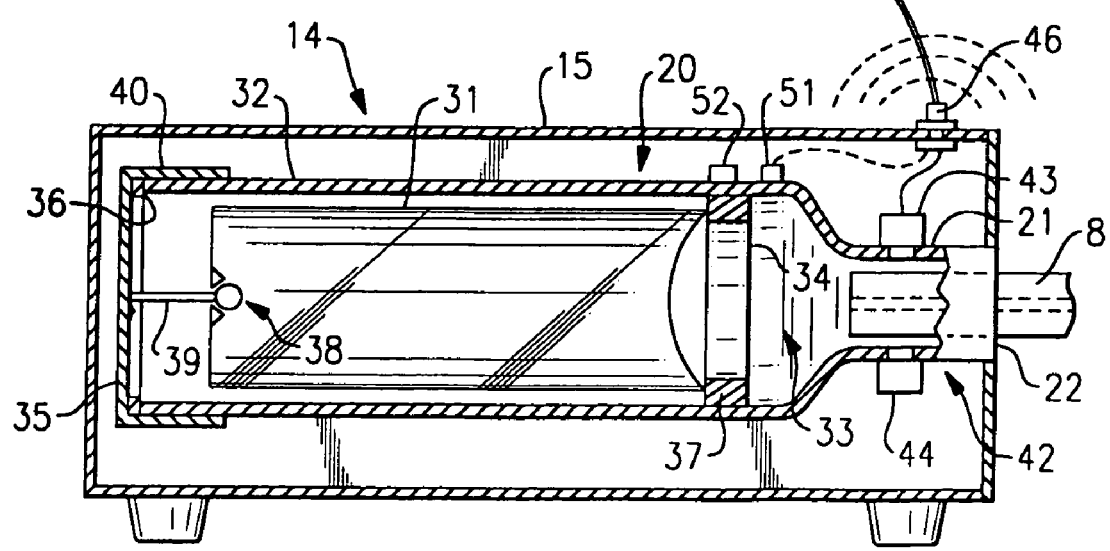
FIG. 2 depicts a sectional view through an example of an embodiment for a separate reference leakage device in accordance with the present invention and FIGS. 3(*a*) and 3(*b*) depict flowcharts for the implementation of a calibration process according to the known art (FIG. 3(*a*)) and with the aid of a reference leakage device (FIG. 3(*b*)) in accordance with the present invention.

FIG. 2 depicts an example of an embodiment for a reference leakage device 14 in accordance with the present invention. The device is equipped with a housing 15, in which the actual reference leakage device 20 is removably accommodated—in a manner not specifically detailed. The actual reference leakage device 20 exhibits a pipe connection 21 opening out through the housing 15 to the outside. The pipe connection 21 forms a commonly constantly open connection between the constriction, details of which are described below, of the actual reference leakage device 20 and an aperture 22 suited for introducing the sniffer tip 8. This arrangement allows the leak detection instrument 1 to be calibrated at any time.

The actual reference leakage device 20 is equipped with an internal pressure vessel 31 with the gas reservoir. This is a common commercially available pressurised dispenser which contains the desired test gas in the liquid state. The pressure in filled cartridges of this type is very temperature dependent. It may commonly not exceed 8 bar (test pressure 12 bar). The maximum temperature to which pressurised dispensers of this type may commonly be exposed, is restricted to 50° C.

In order to employ, even so, from time to time pressure vessels of this kind also at higher ambient temperatures as a gas reservoir for reference leakage devices, a second outer housing 32 is provided. It consists, for example, of steel and is designed for significantly higher pressures than 8 (respectively 12) bar. It exhibits in the area of one face side the constriction 33 designed by way of a diaphragm 34. There then follows the already mentioned pipe connection 21. In the area of the other face side a releasable cap 35, preferably suited for screwing off, is provided. It allows to seal off the housing 32 being separable from the cap. Located between its face side opening and the cap 35, is a sealing ring 36. After removing the cap 35, the inside of the housing 32 is accessible for inserting or removing the pressure vessel 31.

In the area of the face side opposing the cap 35, the housing 32 is equipped with a flange 37 projecting towards the inside. Said flange carries on its side facing the pipe connection 21, the diaphragm 34. The pressure vessel 31 inserted into the housing 32 is supported by the side of the flange 37 facing the cap 35.

In the instance of the example of an embodiment depicted in FIG. 2, the pressure vessel 31 is equipped with a ball valve 38 being located in one of its face sides. The pressure vessel 31 is inserted into the housing 32 such that the valve 38 faces in the cap 35. The cap 35 is equipped with a pin 39 assigned to the valve 38, the length of said pin being so selected that it opens the valve 38 when the cap 35 is completely screwed on. If a pressure vessel without valve 38 is employed, a spike is provided instead of the pin 39, said a spike providing an opening in the pressure vessel 31 upon closing the cap 35. After closing the cap, either the valve 38 is open, or the opening provided by the spike is present so that test gas flows into the housing 32. Decisive for the temperature burden is then no longer pressure vessel 31, but the housing 32 instead.

If it is required to exchange the pressure vessel 31, the actual reference leakage device 20 is taken out of the housing 15 of the reference leakage device 14. Thereafter the housing 32 is opened by unscrewing the cap 35. The rim of the cap 35 is equipped in the vicinity of its upper side with a small bore 40. Said bore allows the pressure to be equalised between the inside of the housing 32 and the surroundings before finally unscrewing the cap 35.

The special advantage of the reference leakage device in accordance with the present invention is that the pressure resistant housing 32 does not have to be exchanged. It may, with respect to its stability, be designed in accordance with the desired requirements. Only during transportation and storage of the pressure vessel 31 need the relatively low ambient temperatures be taken into account. Also the constriction (diaphragm 34) itself does not belong to a disposable product. This offers the advantage that the leak rate of the reference leakage device does not change upon changing the gas reservoir.

In accordance with the present invention the actual reference leakage device 20 of the reference leakage device is equipped with a sensor 42 which senses the presence of a sniffer tip 8 in the pipe connection 21. The sensor 42 may be implemented by way of a Reed contact, for example, or a similar contact. In the instance of the example of the embodiment depicted, the sensor is implemented by way of a light barrier. For this, the pipe connection 21 is equipped with two openings opposing each other, to which a light source 43 (a light emitting diode, for example) and a component 44 which is sensitive to light (a photodiode, for example) are assigned.

Between the sensor 42 and the leak detection instrument 1 there must exist a link, allowing feeding of the sensor signals to the control unit 6 of the leak detection instrument 1. Presented are connectors 46, 47 at the housings 2, respectively 15 as well as a wire link 48. It is especially advantageous when there exists a wireless link, for example, a transmitter in the reference leakage device 14 and a receiver in the leak detection instrument 1, whereby transmitter and receiver are not specifically depicted. This link allows, using only one reference leakage device, the calibration of several leak detection instruments placed at different locations.

It is especially expedient to equip the actual reference leakage device 20 in the vicinity of its constriction with a temperature sensor 51 and to transmit through the link between the actual reference leakage device 20 and the leak detection instrument 1—either wireless or through a wire link—also the signals of the temperature sensor 51 to the control unit 6. These measures allow taking into account the temperature dependent permeability of the constriction 33 of the actual reference leakage device 20 during the calibration of the leak rate indication. In particular, in the instance of reference leakage devices equipped with a diaphragm as the constriction this is of significance, since the permeability of the diaphragm is exponentially temperature dependent. Now in order to attain a reliable calibration of the leak detection instrument, the temperature dependence of the reference leakage device is compensated by a correction curve saved in the software of the instrument (control unit 6). The temperature is measured in the area in which the actual reference leakage device is located.

Expediently the actual reference leakage device 20 is equipped, besides the temperature sensor 51, also with an EEPROM. In FIG. 2, the EEPROM is depicted schematically and designated as 52. If in the EEPROM production date, filling quantity as well as leak rate have been saved, it is thereby possible to provide an estimate as to the point of time when the reservoir will have emptied itself, and when for this reason the actual reference leakage device 20 needs to be exchanged. If the EEPROM 52 is also linked to the control unit 6, this point of time may be indicated on the display of the leak detector.

Figure 3A:
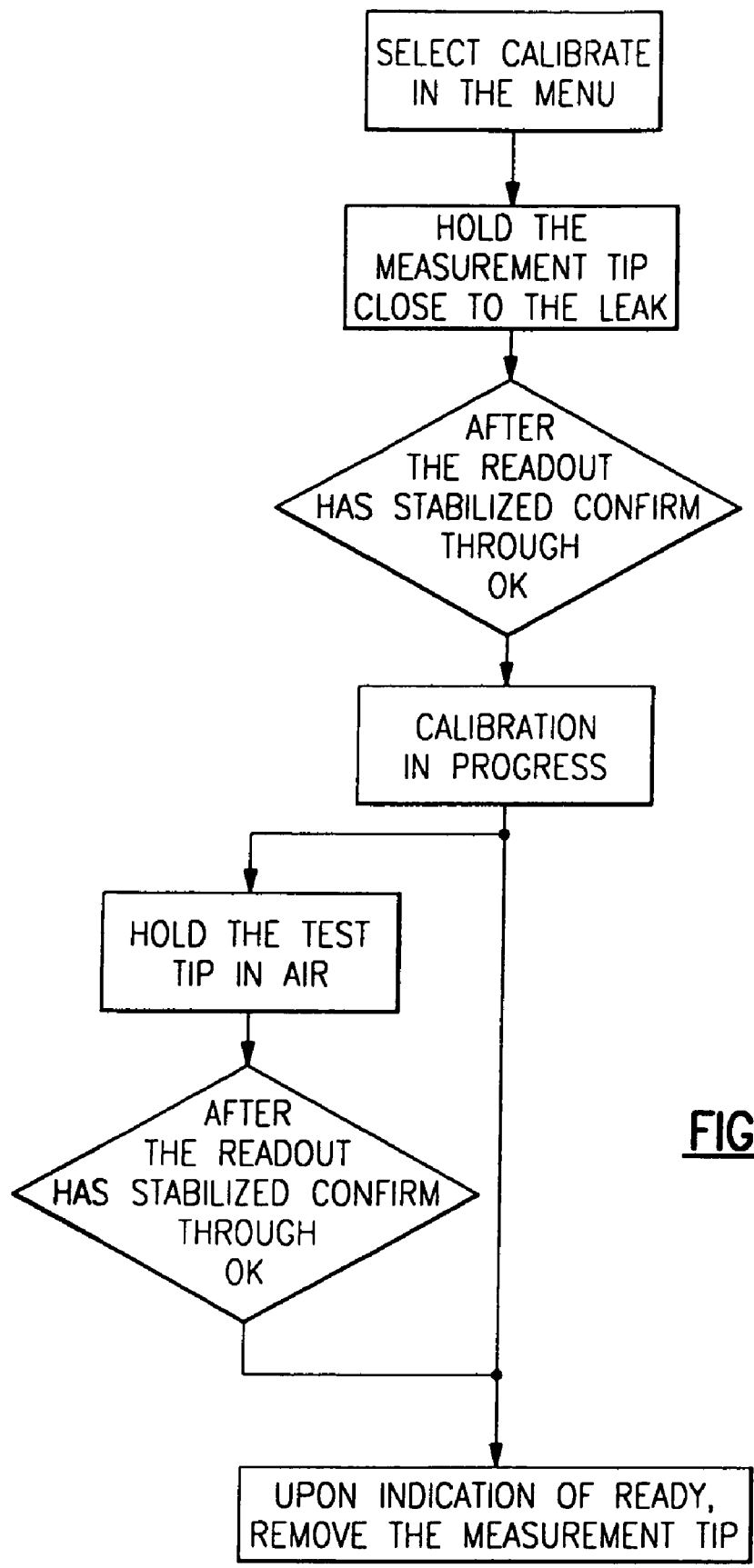
Figure 3B:
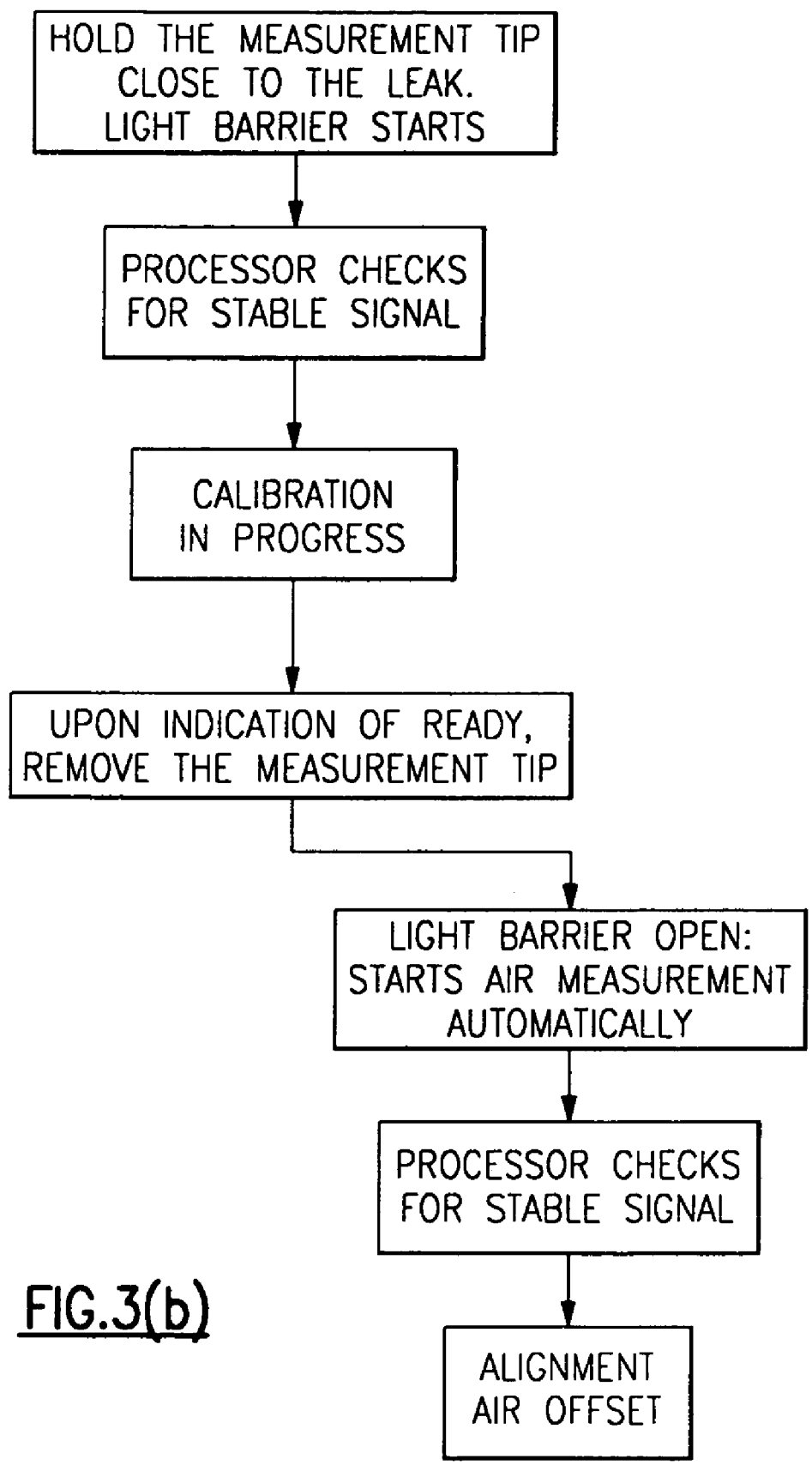

FIGS. 3(a) and 3(b) depict flow charts for the implementation of the calibration process employing instruments according to the state-of-the-art FIG. 3(a) and with the aid of a reference leakage device in accordance with the present invention FIG. 3(b). From the comparison of the flow charts, the simplification of the calibration process due to the present invention is apparent.

The invention claimed is:

1. A reference leakage device for a leak sniffer detector equipped with a sniffing tip and a control unit, said reference leakage device comprising:
   a gas reservoir;
   a constriction wherefrom there is released a specific amount of test gas, at least during calibration;
   a sensor located in the constriction for detecting the approach of the sniffing tip; and
   means for transmitting signals to the control unit of the leak detector.

2. A device in accordance with claim 1, wherein the signal transmitting means are implemented by way of a wire link.

3. A device in accordance with claim 1, wherein the signal transmitting means permit wireless transmission, said reference leakage device having a transmitter disposed on a side of a device housing.

4. A device in accordance with claim 1, wherein the constriction comprises a diaphragm.

5. A device in accordance with claim 1, further comprising a temperature sensor.

6. A device in accordance with claim 1, further comprising a pipe connection protruding through the device to the exterior, said connection exhibiting an opening suited for introducing an intake tip of a sniffer gun.

7. A device in accordance with claim 1, wherein the gas reservoir is contained in a pressure vessel, said pressure vessel being accommodated in a housing and in which the constriction is a component of the housing.

8. A device in accordance with claim 7, wherein the pressure vessel and the housing are cylindrical in shape, said constriction being located in the area of one of two opposing face sides of the housing and where the face side of the housing opposite the constriction is equipped with a releasable screw-on cap.

9. A device in accordance with claim 8, wherein the housing is equipped in the area of the face side opposite the cap with an inwardly protruding flange, said flange supporting the pressure vessel containing the gas reservoir.

10. A device in accordance with claim 8, wherein the pressure vessel is equipped in the area of the cap with a ball valve and in which the cap carries a pin which opens the valve upon screwing on the cap.

11. A device in accordance with claim 8, wherein the cap carries an inwardly pointing spike which upon screwing on the cap penetrates the pressure vessel.

12. A device in accordance with claim 8, wherein the rim of the cap is equipped in the area of its upper side with a bore.

13. A device in accordance with claim 9, wherein the flange carries the diaphragm.

14. A device in accordance with claim 1, further comprising an EEPROM in which at least one of gas type, production date, filling quantity and leak rate have been saved.

15. A device in accordance with claim 1, wherein the means for transmitting the signals of the sensor further permit transmission of signals supplied by at least one of a temperature sensor and an EEPROM equipped on said device.

* * * * *